(12) United States Patent  
Xie

(10) Patent No.: US 9,354,471 B2  
(45) Date of Patent: May 31, 2016

(54) DISPLAY SUBSTRATE, METHOD FOR FABRICATING THE SAME AND LIQUID CRYSTAL DISPLAY PANEL

(71) Applicant: BOE TECHNOLOGY GROUP CO., LTD., Beijing (CN)

(72) Inventor: Chang Xie, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 184 days.

(21) Appl. No.: 14/235,947

(22) PCT Filed: Sep. 27, 2013

(86) PCT No.: PCT/CN2013/084458  
§ 371 (c)(1),  
(2) Date: Jan. 29, 2014

(87) PCT Pub. No.: WO2014/190648  
PCT Pub. Date: Dec. 4, 2014

(65) Prior Publication Data  
US 2015/0029454 A1    Jan. 29, 2015

(30) Foreign Application Priority Data

May 31, 2013   (CN) .......................... 2013 1 0211853

(51) Int. Cl.  
*G02F 1/1337* (2006.01)  
*G02F 1/1335* (2006.01)  
*G02F 1/139* (2006.01)

(52) U.S. Cl.  
CPC ............ *G02F 1/1337* (2013.01); *G02F 1/1395* (2013.01); *G02F 1/133555* (2013.01);

(Continued)

(58) Field of Classification Search  
CPC ................... G02F 1/133555; G02F 1/133784; G02F 1/33788; G02F 2001/133761; G02F 2001/133773; G09G 2300/0456  
See application file for complete search history.

(56) References Cited

U.S. PATENT DOCUMENTS

| | | | |
|---|---|---|---|
| 5,909,265 A * | 6/1999 | Kim | G02F 1/133753 349/124 |
| 6,097,463 A * | 8/2000 | Chen | G02F 1/133753 349/126 |
| 2003/0038909 A1 | 2/2003 | Ikeno et al. | |

(Continued)

FOREIGN PATENT DOCUMENTS

CN   102981300 A   3/2013  
CN   103087726 A   5/2013

OTHER PUBLICATIONS

International Search Report Issued Feb. 24, 2014; Appln. No. PCT/CN2013/084458.

(Continued)

*Primary Examiner* — Paisley L Arendt  
(74) *Attorney, Agent, or Firm* — Ladas & Parry LLP

(57) ABSTRACT

The embodiments of the invention disclose a display substrate, a method for fabricating the same and a liquid crystal display panel. The display panel is used for constructing a transflective liquid crystal display panel including a transmissive region and a reflective region. The display substrate includes an alignment layer which comprises a first alignment structure in the transmissive region and a second alignment structure in the reflective region. The first alignment structure is an oblique alignment structure and the second alignment structure is a vertical alignment structure.

3 Claims, 3 Drawing Sheets

(52) U.S. Cl.
CPC .... *G02F1/133753* (2013.01); *G02F 1/133784* (2013.01); *G02F 1/133788* (2013.01); *G02F 2001/133761* (2013.01); *G02F 2001/133773* (2013.01); *G09G 2300/0456* (2013.01)

(56) References Cited

U.S. PATENT DOCUMENTS

2006/0114381 A1\* 6/2006 Yang ................. G02F 1/133555
                                                    349/114

OTHER PUBLICATIONS

First Chinese Office Action Feb. 16, 2015; Appln. No. 201310211853.5.
Second Chinese Office Action Appln No. 2013102118535.5; Dated Jul. 13, 2015.
International Preliminary Report an Patentability issued Dec. 1, 2015; PCT/CN2013/084458.

\* cited by examiner

DISPLAY SUBSTRATE, METHOD FOR FABRICATING THE SAME AND LIQUID CRYSTAL DISPLAY PANEL

FIELD OF THE ART

Embodiments of the invention relate to a display substrate, a method for fabricating the same and a liquid crystal display panel.

BACKGROUND

A liquid crystal display panel is generally formed by a color film substrate and an array substrate assembled together and a liquid crystal layer encapsulated in the space between the color film substrate and the array substrate. As liquid crystal molecules do no produce light by themselves, a light source is required by a liquid crystal display panel to display images. According to different types of adopted light sources, the liquid crystal display panels are generally categorized into transmissive liquid crystal display panels, reflective liquid crystal display panels and transflective liquid crystal display panels, in which the transflective liquid crystal display panels are also referred to as semi-transmissive and semi-reflective liquid crystal display panels.

A transflective liquid crystal display panels is generally formed by assembling a color film substrate and an array substrate, and liquid crystals are filled between the color film substrate and the array substrate to form a liquid crystal cell. The transflective liquid crystal display panel has a plurality of pixel regions, each of which comprises a plurality of sub-pixel regions, and each sub-pixel region comprises a transmissive region and a reflective region. Light entering the reflective region passes through the reflective region twice where the transflective liquid crystal display panel works in a reflective mode, while light entering the transmissive region passes through the transmissive region only once where the reflective LCD works in the transmissive mode. As a result, light beams emitted from different light sources in the transflective liquid crystal display panel under different working modes travels along different optical paths in the reflective and transmissive regions, which causes a significant color difference between the reflective and transmissive regions under different working modes, and results in inharmonious colors in images displayed by transflective LCDs.

A reason for the above issues lies in that light beams travel along different optical paths in the reflective and transmissive regions, which causes the light beams in the reflective and transmissive regions are unmatched in phase delay. To overcome the phenomenon of uncoordinated colors, the transflective liquid crystal display panel currently employs a design called dual cell gap, that is, the liquid crystal cell in the reflective region has a cell gap which is half that of the liquid crystal cell in the transmissive region, such that the optical paths experienced by the light beams passing the reflective and transmissive regions match each other, thereby assuring a relative small color difference between the transmissive region and the reflective region and a harmonious color. However, different cell gaps in the liquid crystal cell of such-constructed liquid crystal display panel make the fabrication process for the liquid crystal display panels complicated and make the cell gap uniformity difficult to control. Moreover, different cell gaps of the liquid crystal may cause deformation to the liquid crystal molecules at the interface between the reflective and transmissive regions, thus resulting in low contrast ratio and poor color saturation at the interface.

SUMMARY

An embodiment of the invention provides a display substrate for constructing a transflective liquid crystal display panel comprising a transmissive region and a reflective region. The display substrate comprises an alignment layer which comprises a first alignment structure in the transmissive region and a second alignment structure in the reflective region. The first alignment structure is an oblique alignment structure and the second alignment structure is a vertical alignment structure.

Optionally, the display substrate is an array substrate comprising a first base substrate, an array substrate structure and the alignment layer, the array substrate structure is formed on the first base substrate, and the alignment layer is formed on the array substrate structure.

Optionally, the display substrate is a color film substrate, the color film substrate comprises a second base substrate, a color film substrate structure and the alignment layer, the color film substrate structure is formed on the first base substrate, and the alignment layer is formed on the color film substrate structure.

Another embodiment of the invention provides a method for fabricating a display substrate for constructing a transflective liquid crystal display panel comprising a transmissive region and a reflective region. The method comprises: forming a display substrate structure on a base substrate; forming an alignment base layer on the display substrate structure; performing an alignment treatment for the alignment base layer so as to form a first alignment structure in the transmissive region and a second alignment structure in the reflective region, the first alignment structure being an oblique alignment structure and the second alignment structure being a vertical alignment structure.

Optionally, the performing an alignment treatment for the alignment base layer so as to form a first alignment structure in the transmissive region and a second alignment structure in the reflective region comprises: performing a rubbing alignment treatment for the alignment base layer such that the first alignment structure and the second alignment structure are formed to be oblique alignment structures; performing a photoalignment treatment for the second alignment structure such that the second alignment structure is formed to be a vertical alignment structure.

Optionally, the performing an alignment treatment for the alignment base layer so as to form a first alignment structure in the transmissive region and a second alignment structure in the reflective region comprises: performing a photoalignment treatment for the alignment base layer such that the first alignment structure and the second alignment structure are formed to be oblique alignment structures; performing a photoalignment treatment for the second alignment structure such that the second alignment structure is formed to be a vertical alignment structure.

Optionally, the fainting the display substrate structure on the base substrate comprises: forming an array substrate structure on the base substrate; or forming a color film substrate structure on the base substrate.

Still another embodiment of the invention provides a transflective liquid crystal display panel comprising a transmissive region and a reflective region comprises a first display substrate and a second display substrate oppose to each other, and a liquid crystal layer is filled between the first display substrate and the second display substrate; The alignment structures for a first alignment film formed on the first display substrate and a second alignment film formed on the second display substrate are configured such that phase delay of light beam after passing through the transmissive region matches that of light beam after passing through the reflective region when no voltage is applied to the liquid crystal display panel.

Optionally, the alignment structures for the first and second alignment films are configured such that the effective refractive index of the liquid crystal layer in the transmissive region is substantially twice that of the liquid crystal layer in the reflective region.

Optionally, a thickness of the liquid crystal layer in the transmissive region is substantially equal to that of the liquid crystal layer in the reflective region.

Optionally, the first alignment film has an oblique structure in the transmissive region and a vertical structure in the reflective region; the second alignment film has an oblique structure both in the transmissive region and the reflective region.

Optionally, the second alignment film has an oblique structure in the transmissive region and a vertical structure in the reflective region; the first alignment film has an oblique structure both in the transmissive region and the reflective region.

Optionally, the liquid crystal layer is a positive liquid crystal layer.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make technical details of the embodiments of the invention apparent, display substrates, methods for fabricating the same and liquid crystal display panels provided by the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the invention provides a display substrate, a method for fabricating the same and a liquid crystal display panel capable of realizing the match between phase delays of light beams passing through transmissive and reflective regions by means of a design of alignment structure for a alignment layer of the display substrate, without changing cell gap of the liquid crystal display panel. It therefore improves the contrast ratio and the color saturation at the interface between the reflective and transmissive regions, which in turn improves the display quality of the liquid crystal display panel. Meanwhile, the structure design of single cell gap can simplify the fabrication process for the liquid crystal display panel.

First Embodiment

A first embodiment of the invention provides a display substrate for constructing a transflective liquid crystal display panel comprising a transmissive region and a reflective region. The display substrate comprises an alignment layer which comprises a first alignment structure in the transmissive region and a second alignment structure in the reflective region. The first alignment structure is an oblique alignment structure and the second alignment structure is a vertical alignment structure.

It should be understood that, in this embodiment and other embodiments to be described, the term "oblique alignment structure" refers to an alignment structure enabling liquid crystal molecules adjacent thereto, when no other forces are present, to have a pretilt angle ranging from 0 to 90 degrees (preferably ranging from 0 to 60 degrees) with regard to the plane of the alignment film; the term "vertical alignment structure" refers to an alignment structure enabling liquid crystal molecules adjacent thereto, when no other forces are present, to have a pretilt angle of about 90 degrees with regard to the plane of the alignment film. Moreover, the term "display substrate" may refers to a substrate used for producing a liquid crystal display panel, such as an array substrate or a color film substrate. In liquid crystal display panels using the Color Filter on Array (COA) technology, the term "display substrate" may also refer to a counter-substrate disposed opposed to an array and color film substrate so as to form a liquid crystal cell.

Figure 1:
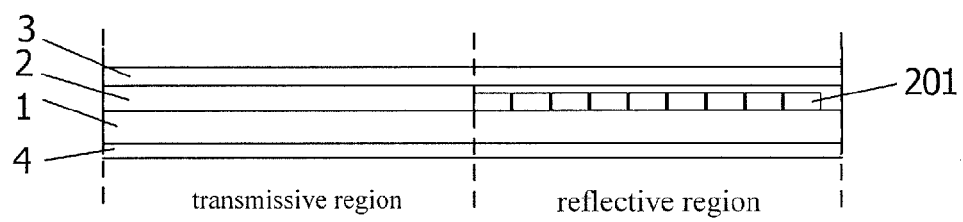
FIG. 1 schematically illustrates a partial cross section view of an exemplary structure of a display substrate in accordance with a first embodiment of the invention.

FIG. 1 schematically illustrates a partial cross section view of a display substrate in accordance with the first embodiment of the invention, in which the display substrate is an array substrate of a liquid crystal display panel. As illustrated in FIG. 1, the array substrate 10 comprises a first base substrate 1, an array substrate structure 2 formed on the first base substrate 1 and an alignment layer 3 formed on the array substrate structure 2. The alignment layer 3 comprises a first alignment structure in a transmissive region and a second alignment structure in a reflective region. The first alignment structure is an oblique alignment structure and the second alignment structure is a vertical alignment structure. Herein, the array substrate structure 2 is provided with a reflection layer 201 in the reflective region. As an example, the array substrate structure 2 may further comprises a gate line and a data line for defining a pixel unit, a thin film transistor (TFT) formed within the pixel unit, a pixel electrode electrically connected to the thin film transistor, and a passivation layer formed between the pixel electrode and the thin film transistor. The detailed structure of the array substrate structure 2 as described in the embodiment is merely taken as an example and other particular structures can be adopted in other examples. In addition, the gate line, the data line, the pixel element, the thin film transistor, the pixel electrode and the passivation layer described in the embodiment of the array substrate are not illustrated in the figure. The reflection layer 201 can be formed in the reflective region and positioned between the passivation layer and the first base substrate 1.

Optionally, an array polarizer layer 4 is further formed on back side of the first base substrate 1.

In the above example, the match between the phase delays of light beams passing through the transmissive and reflective regions is realized by designing the alignment structure of the alignment layer in the array substrate working as the display substrate, without changing the cell gap of the liquid crystal display panel. It therefore improves the contrast ratio and the color saturation at the interface between the reflective and transmissive region, which in turn improves the display quality of the liquid crystal display panel.

Figure 2:
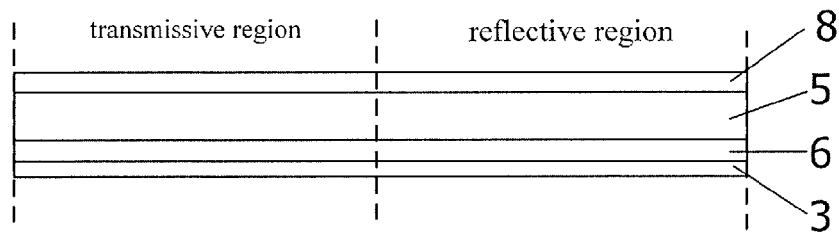
FIG. 2 schematically illustrates a partial cross section view of another exemplary structure of a display substrate in accordance the first embodiment of the invention.

FIG. 2 schematically illustrates a partial cross section view of a display substrate in accordance with the first embodiment of the invention, in which the display substrate is a color film substrate of a liquid crystal display panel. As illustrated in FIG. 2, the color film substrate 20 comprises a second base substrate 5, a color film substrate structure 6 formed on the second base substrate 5 and an alignment layer 3 formed on the color film substrate structure 6. The alignment layer 3 comprises a first alignment structure in the transmissive region and a second alignment structure in the reflective region. The first alignment structure is an oblique alignment structure and the second alignment structure is a vertical alignment structure. Herein, the color film substrate structure 6 may further comprise a color matrix pattern, a black matrix pattern and a common electrode layer formed above the color matrix pattern and the black matrix pattern. The detailed structure of the color film substrate structure 3 as described in the embodiment is merely taken as an example and other particular structures can be adopted in other examples. In addition, the color matrix pattern, the black matrix pattern and the common electrode layer in the color film substrate described in the embodiment are not shown in the figure.

Optionally, a color film polarizer 8 is further formed on back side of the second base substrate 5.

In the above example, the match between the phase delays of light beams passing through the transmissive and reflective regions is realized by designing the alignment structure of the alignment layer in the color filter substrate working as the display substrate, without changing the cell gap of the liquid crystal display panel. It therefore improves the contrast ratio and the color saturation at the interface between the reflective and transmissive region, which in turn improves the display quality of the liquid crystal display panel.

In the first embodiment of the invention, the match between the phase delays of light beams passing through the transmissive and reflective regions is realized by designing the alignment structure of the alignment layer in the display substrate display substrate, without changing the cell gap of the liquid crystal display panel. It therefore improves the contrast ratio and the color saturation at the interface between the reflective and transmissive region, which in turn improves the display quality of the liquid crystal display panel. Meanwhile, the single cell gap structure design can simplify the fabrication process for the liquid crystal display panel.

Second Embodiment

The second embodiment of the invention provides a method for fabricating a display substrate for constructing a transflective liquid crystal display panel. The method comprises:

Step 1001: forming a display substrate structure on a base substrate;

Step 1002: forming an alignment base layer on the display substrate structure;

Step 1003: performing an alignment treatment for the alignment base layer to form a first alignment structure in a first region and a second alignment structure in a second region, the first alignment structure being an oblique alignment structure and the second alignment structure being a vertical alignment structure.

Optionally, the step 1003 comprises:

Step 1013: performing a rubbing alignment treatment for the alignment base layer such that the first alignment structure and the second alignment structure are formed to be oblique alignment structures;

Step 1023: performing an additional photoalignment treatment for the second alignment structure such that the second alignment structure is formed to be a vertical alignment structure.

Optionally, the step 1003 comprises:

Step 1033: performing a photoalignment treatment for the alignment base layer such that the first alignment structure and the second alignment structure are formed to be oblique alignment structures;

Step 1043: performing an additional rubbing alignment treatment for the second alignment structure such that the second alignment structure is formed to be a vertical alignment structure.

Optionally, the step 1001 comprises:

Step 1011: forming an array substrate structure on a base substrate;

Or step 1021: forming a color film substrate structure on a base substrate.

In the fabricating method provided by the second embodiment of the invention, the match between the phase delays of light beams passing through the transmissive and reflective regions is realized by designing the fabricating method for the alignment layer of the display substrate, without changing the cell gap of the liquid crystal display panel. It therefore improves the contrast ratio and the color saturation at the interface between the reflective and transmissive region, which in turn improves the display quality of the liquid crystal display panel. Meanwhile, the single cell gap structure design can simplify the fabrication process for the liquid crystal display panel.

Third Embodiment

Figure 3:
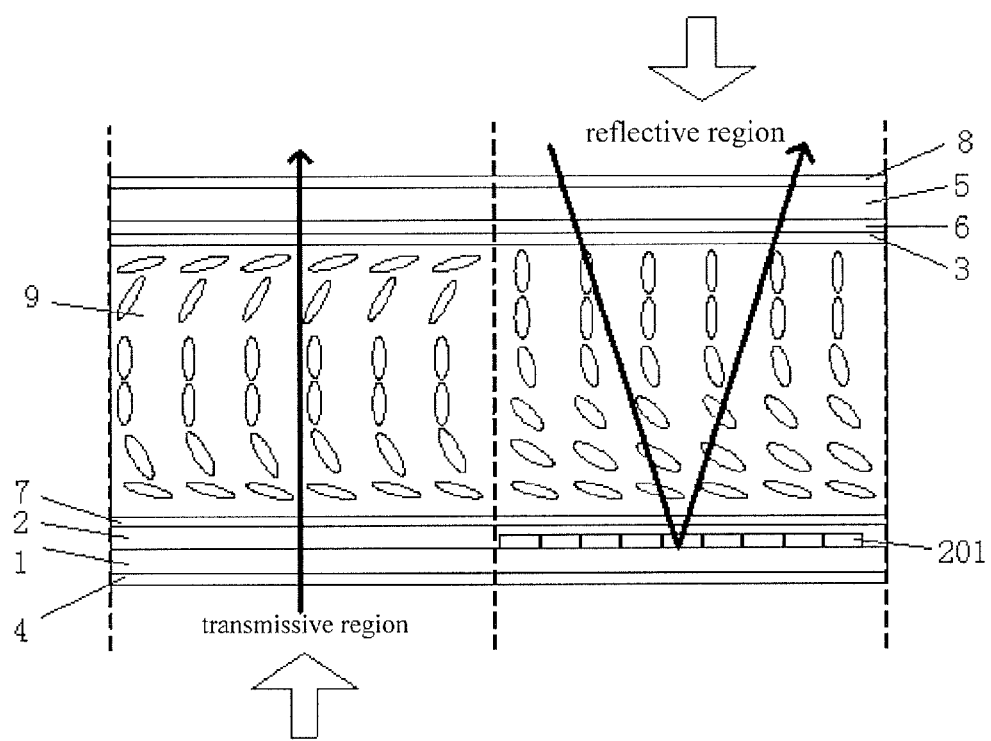
FIG. 3 schematically illustrates a partial cross section view of a liquid crystal display panel provided by a third embodiment of the invention.
Figure 4:
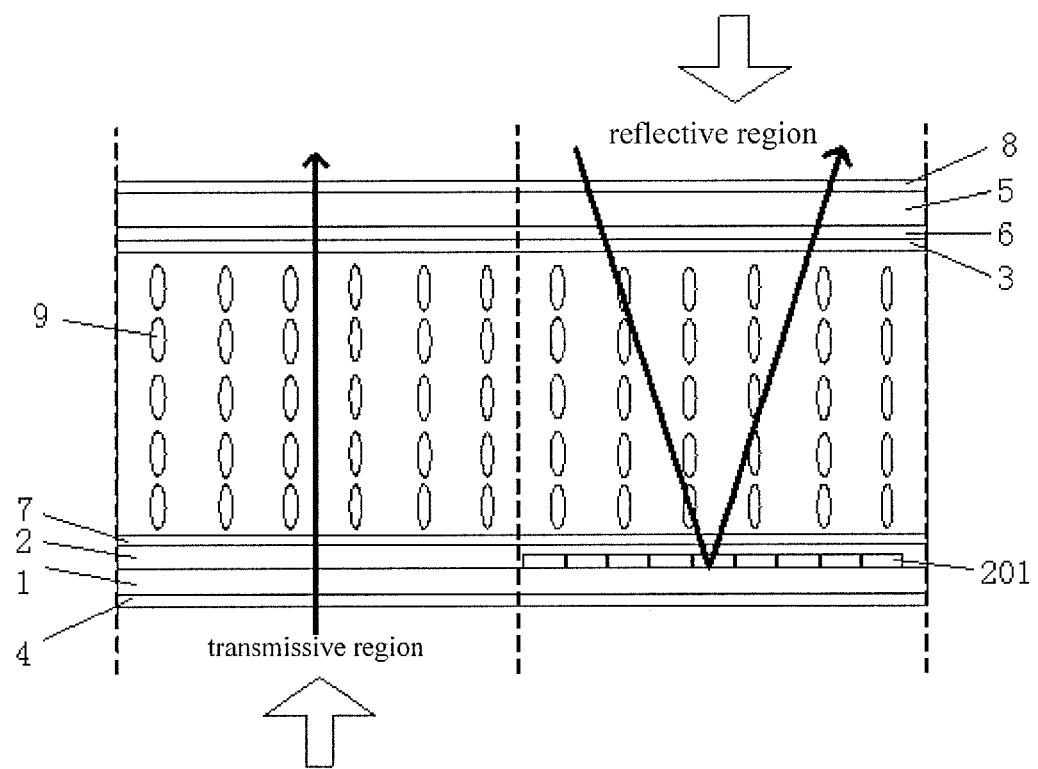
FIG. 4 schematically illustrates an arrangement of liquid crystal molecules in the liquid crystal display panel of FIG. 3 when a voltage is applied thereto.

FIG. 3 schematically illustrates a partial cross section view of a liquid crystal display panel provided by the third embodiment of the invention. As illustrated in FIGS. 3 and 4, the liquid crystal display panel comprises an array substrate and a color film substrate opposite to each other, and a liquid crystal layer 9 is filled between the array substrate and the color film substrate. FIG. 3 further illustrates an arrangement of liquid crystal molecules in the liquid crystal layer when no voltage is applied to the liquid crystal display panel. FIG. 4 schematically illustrates an arrangement of liquid crystal molecules in the liquid crystal layer when a voltage is applied to the liquid crystal display panel of FIG. 3.

In an example, the array substrate can be the array substrate 10 provided by the first embodiment described above; the color film substrate can be a color film substrate having an alignment layer wholly of oblique alignment structure.

In another example, the color film substrate can be the display substrate 20 provided by the first embodiment described above, the array substrate can be an array substrate having an alignment layer wholly of oblique alignment structure.

Hereinafter, a case wherein the color film substrate is the color film substrate provided by the first embodiment and the array substrate is an array substrate having an alignment layer wholly of oblique alignment structure will be described in detail with reference to FIG. 3. The color filter substrate comprises the second base substrate 5, the color film substrate structure 6 and the alignment layer 3, wherein the alignment layer 3 of the color filter substrate comprises a first alignment structure in the transmissive region and a second alignment structure in the reflective region, the first alignment structure is an oblique alignment structure and the second alignment structure is a vertical alignment structure. The color film substrate structure 6 can comprise a color matrix pattern, a black matrix pattern and a common electrode layer formed above the color matrix pattern and the black matrix pattern. The array substrate comprises a first base substrate 1, an array substrate structure 2 and an alignment layer, wherein the array substrate structure 2 can comprise a gate line and a data line defining a pixel unit; a thin film transistor formed within the pixel unit and a pixel electrode electrically connected to the thin film transistor, a passivation layer formed between the pixel electrode and the thin film transistor, and an internal reflection layer 201 formed in the reflective region and positioned between the passivation layer and the first base substrate 1. The alignment layer 7 of the array substrate as a whole is an oblique alignment structure. The detailed structures of the array substrate structure 2 and the color film substrate structure 6 described in the embodiment are merely taken as examples and other particular structures can be adopted in other examples.

As for a case wherein the array substrate is the array provided by the first embodiment and the alignment layer of the color film substrate as a whole is an oblique alignment structure, the detailed structure of the array substrate is described with reference to the first embodiment and will thus not be repeated here. The color film substrate comprises a second base substrate, a color film substrate structure and an alignment layer, wherein the alignment layer of the color film substrate as a whole is an oblique alignment structure. No figure is provided for such a case.

Optionally, the liquid crystal layer 9 is a positive liquid crystal layer.

In an example, an array polarizer layer 4 can be formed on the back side of the first base substrate 1, and a color film polarizer layer 8 can be formed on the back side of the second base substrate 5.

The principle of the embodiment of the invention will be described in detail in connection with FIGS. 3 and 4. As illustrated in FIG. 3, when no voltage is applied to the liquid crystal display panel, since the part of the alignment layer 7 of the array substrate that is in the transmissive region has a certain tilt angle and the part of the alignment layer 3 of the color film substrate that is in the transmissive region has a certain tilt angle, liquid crystals in the transmissive region that are close to the alignment layer 7 of the array substrate and the alignment layer 3 of the color film substrate will be rotated by a certain degree and thus drive liquid crystals adjacent thereto to rotate as well. As an example, the transmissive region employs an optically compensated birefringence (OCB) mode. In the reflective region, the apart of the alignment layer 7 of the array substrate that is in the reflective region has a tilt angle, while the alignment layer 3 of the color film substrate that is in the reflective region has a vertical alignment structure which has no rotation effect on the liquid crystal molecules which are also vertical aligned. Therefore, in the reflective region, the liquid crystals that are close to the alignment layer 3 of the color film substrate will not be rotated, while those close to the alignment layer 7 of the array substrate will be rotated by a certain degree. When there are light rays passing through the transmissive region and the reflective region, light ray after passing through a unit-thickness of the liquid crystal layer in the transmissive region generates a larger phase delay with regard to light ray after passing through the unit-thickness of the liquid crystal layer in the reflective region, while the liquid crystal layer in the transmissive region has a relatively larger effective refractive index with regard to the light passing there-through than that in the reflective region due to the different tilt angles set for the alignment layer of the color film substrate in the transmissive and reflective regions. For example, the effective refractive index Am, of the liquid crystal layer in the transmissive region is made to be twice the effective refractive index $\Delta n_{Re}$ of that in the reflective region, that is, $\Delta n_{Tr}=2\times\Delta n_{Re}$, while light in the reflective region is reflected by the reflection layer 201 and thus regarded as passing through the liquid crystal layer 9 twice, which means that the actual path lengths satisfy $d_{Re}=2\times d_{Tr}$, that is, the actual path length of the light in the reflective region is twice that of the light in the transmissive region. Since the phase delay (optical path difference)=effective refractive index×actual path length and $\Delta n_{Tr}\times d_{Tr}=\Delta n_{Re}\times d_{Re}$, light after passing through the liquid crystal layer in the transmissive region and light after passing through that in the reflective region has substantially the same phase delay, thereby realizing the match between the phase delay in the transmissive region and the reflective region and achieving an excellent transflective display effect.

As illustrated in FIG. 4, when a voltage is applied to the liquid crystal display panel, the liquid crystal layer 9 in both the transmissive and the reflective regions is under the action of a vertical electric field, and the liquid crystal molecules are vertical aligned. In this case, vertically incoming light will not generate any phase delay after passing through the vertically arranged liquid crystal layer 9. As the polarization direction of the exiting light is not changed, the exiting light will be totally blocked by the color film polarizer 8, resulting in a dark state.

In the liquid crystal display panel provided by the third embodiment of the invention, the match between the phase delays in light beams passing through the transmissive and reflective regions is realized by designing the alignment layers of the array substrate and the color film substrate, without changing the cell gap of the liquid crystal display panel. It therefore improves the contrast ratio and the color saturation at the interface between the reflective and transmissive region, which in turn improves the display quality of the liquid crystal display panel. Meanwhile, the single cell gap structure design can simplify fabrication process for liquid crystal display panel.

Although the present invention has been described in detail with reference to particular embodiments thereof, some modifications or improvements can also be made on the basis of the present invention, which is evident to those skilled in the art. Therefore, the modifications or improvements, which are made without departing from the spirit of the present invention, all belong to the protection scope of the present invention.

What is claimed is:

1. A method for fabricating a display substrate for constructing a transflective liquid crystal display panel comprising a transmissive region and a reflective region, comprising:
   forming a display substrate structure on a base substrate;
   forming an alignment base layer on the display substrate structure;
   performing an alignment treatment for the alignment base layer so as to form a first alignment structure in the transmissive region and a second alignment structure in the reflective region, the first alignment structure being an oblique alignment structure and the second alignment structure being a vertical alignment structure, wherein, the performing an alignment treatment for the alignment base layer so as to form a first alignment structure in the transmissive region and a second alignment structure in the reflective region comprises:
   performing a rubbing alignment treatment for the alignment base layer such that the first alignment structure and the second alignment structure are formed to be oblique alignment structures;

performing a photoalignment treatment for the second alignment structure of the oblique alignment structure formed by the rubbing alignment treatment such that the second alignment structure is formed to be vertical alignment structure.

2. The method of claim 1, wherein the forming the display substrate structure on the base substrate comprises: forming an array substrate structure on the base substrate;

or forming a color film substrate structure on the base substrate.

3. A method for fabricating a display substrate for constructing a transflective liquid crystal display panel comprising a transmissive region and a reflective region, comprising:

forming a display substrate structure on a base substrate;

forming an alignment base layer on the display substrate structure;

performing an alignment treatment for the alignment base layer so as to form a first alignment structure in the transmissive region and a second alignment structure in the reflective region, the first alignment structure being an oblique alignment structure and the second alignment structure being a vertical alignment structure, wherein the performing an alignment treatment for the alignment base layer so as to form a first alignment structure in the transmissive region and a second alignment structure in the reflective region comprises:

performing a photoalignment treatment for the alignment base layer such that the first alignment structure and the second alignment structure are formed to be oblique alignment structures;

performing a photoalignment treatment for the second alignment structure of the oblique alignment structure formed by the photoalignment treatment such that the second alignment structure is formed to be a vertical alignment structure.

* * * * *